No. 639,318. Patented Dec. 19, 1899.
C. P. VAUGHN.
MACHINE FOR TREATING HIDES OR SKINS.
(Application filed May 5, 1898.)
(No Model.) 3 Sheets—Sheet 1.

WITNESSES.
Matthew M. Blunt
J. Murphy

INVENTOR.
Charles P. Vaughn
by Jas. H. Churchill
ATT'Y.

No. 639,318. Patented Dec. 19, 1899.
C. P. VAUGHN.
MACHINE FOR TREATING HIDES OR SKINS.
(Application filed May 5, 1898.)
(No Model.) 3 Sheets—Sheet 3.
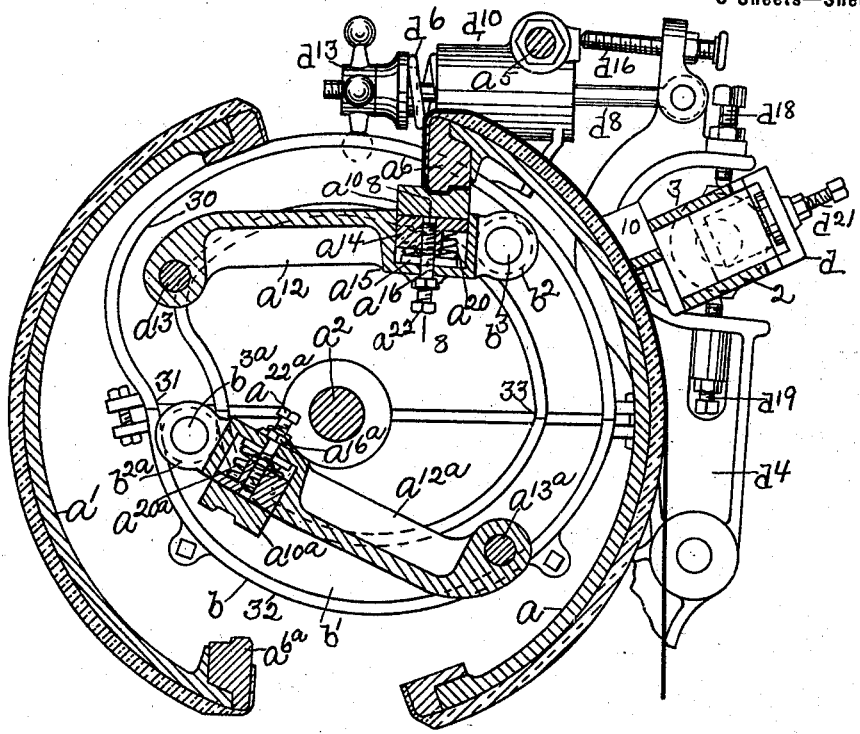
WITNESSES.
Matthew M. Blunt
J. Murphy.
INVENTOR.
Charles P. Vaughn
By Jas. H. Churchill
ATT'Y.

UNITED STATES PATENT OFFICE.

CHARLES P. VAUGHN, OF SALEM, MASSACHUSETTS, ASSIGNOR TO THE VAUGHN MACHINE COMPANY, OF PORTLAND, MAINE.

MACHINE FOR TREATING HIDES OR SKINS.

SPECIFICATION forming part of Letters Patent No. 639,318, dated December 19, 1899.

Application filed May 5, 1898. Serial No. 679,750. (No model.)

*To all whom it may concern:*

Be it known that I, CHARLES P. VAUGHN, a citizen of the United States, residing in Salem, in the county of Essex and State of Massachusetts, have invented an Improvement in Machines for Treating Hides or Skins, of which the following description, in connection with the accompanying drawings, is a specification, like letters and figures on the drawings representing like parts.

This invention relates to a machine for treating hides and skins, and is herein shown as embodied in a machine especially adapted for unhairing hides and skins.

One of the features of this invention consists in providing the machine with an operating-tool having a substantially large area of surface contact with the hide or skin being treated, whereby the fine hairs and dirt may be removed from the hide or skin without injury to the grain.

Another feature of this invention consists in a novel clamping mechanism of simple construction, as will be described.

These and other features of this invention will be pointed out in the claims at the end of this specification.

Figure 1:
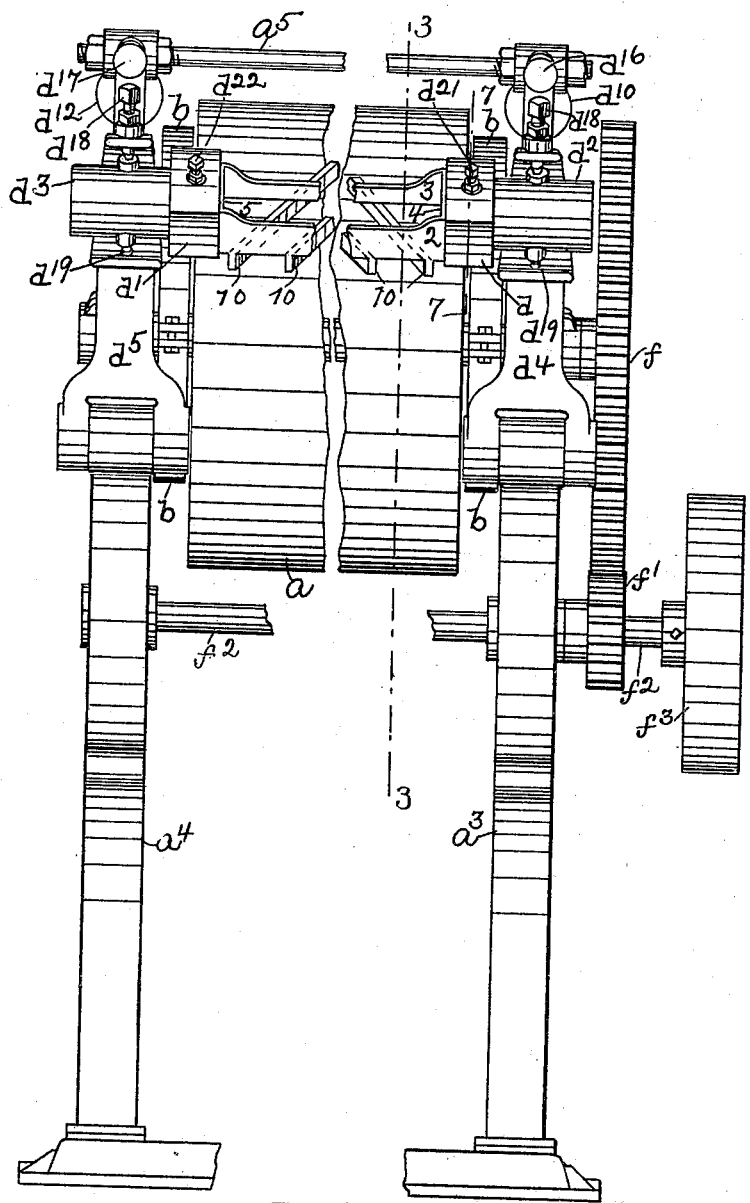
Figure 2:
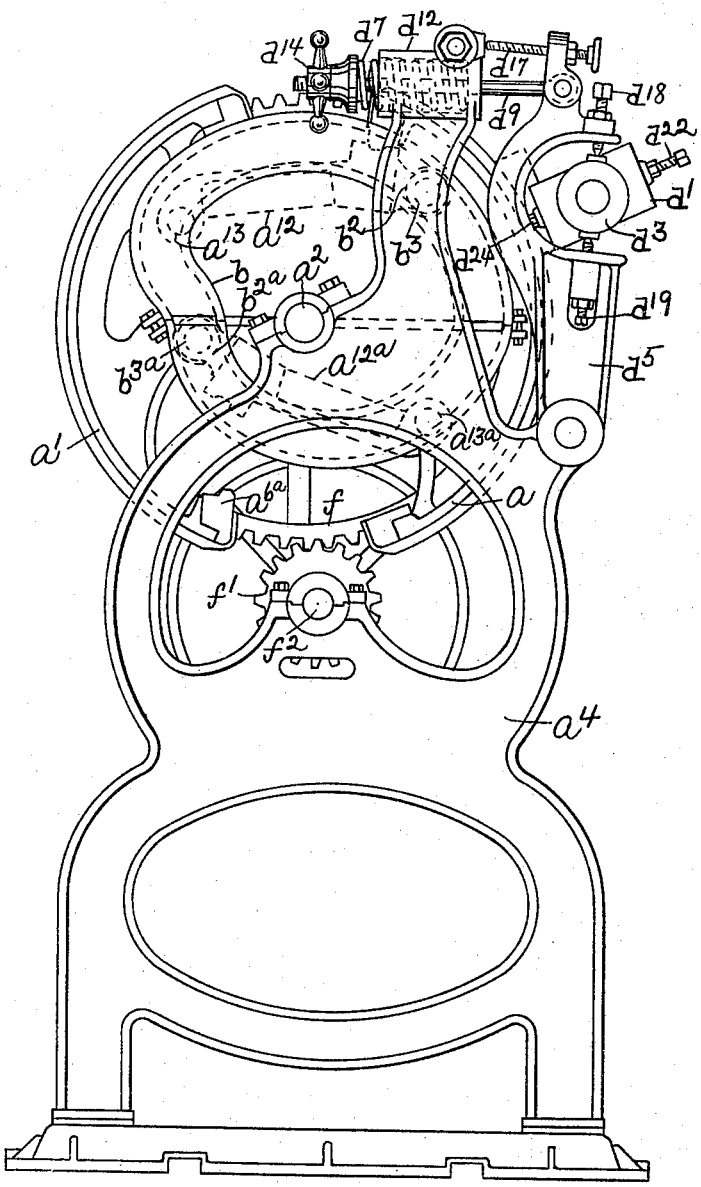

Figure 1 is a front elevation, with parts broken away, of a machine embodying this invention; Fig. 2, a side elevation of the machine shown in Fig. 1; Fig. 3, a section on the line 3 3, Fig. 1, looking toward the left; Fig. 4, a detail in elevation of the operating-tool shown in Fig. 1; Fig. 5, an inverted plan view of the tool shown in Fig. 4; Fig. 6, an end elevation of the tool shown in Fig. 4; Fig. 7, a sectional detail on the line 7 7, Fig. 1; and Fig. 8, a sectional detail on the line 8 8, Fig. 3.

The machine herein shown as embodying this invention comprises two drum-segments $a$ $a'$, mounted on a shaft $a^2$, which may be rotated in one direction. The drum-shaft $a^2$ is supported in suitable bearings in a framework consisting, as shown, of side uprights $a^3$ $a^4$, joined by suitable tie-rods $a^5$. The drum-segments $a$ $a'$ have coöperating with them clamping mechanisms for the hides or skins, and as both of said clamping mechanisms are preferably of like construction only one need be specifically described—namely, that coöperating with the drum-segment $a$. This clamping mechanism comprises a fixed jaw $a^6$, suitably fastened to the drum-segment $a$, and a movable jaw, which in accordance with this invention comprises a bar $a^{10}$ of substantially the length of the drum-segment $a$ and supported near its opposite ends by levers or pivoted arms $a^{12}$, only one of which is shown in Fig. 3, the said levers being pivotally mounted on a rod $a^{13}$, supported by the sides of the drum-segment $a'$. The clamping-bar $a^{10}$ is yieldingly supported on the levers $a^{12}$, which may be accomplished as herein shown, the bar $a^{10}$ being fastened to a metal back $a^{14}$, fitted into slots, sockets, or recesses $a^{15}$ in said levers and secured thereto by bolts $a^{16}$, extended loosely through the back of the levers into threaded sockets $a^{17}$ in the metal back $a^{14}$, the said bolts being locked in their adjusted position in the said sockets by nuts $a^{18}$. The clamping-bar $a^{10}$ is normally forced outward away from the levers $a^{12}$ by a yielding medium, shown as spiral springs $a^{20}$, which, as represented, are located in the recesses $a^{15}$ and bear against the back $a^{14}$ and a movable plate $a^{21}$, which latter may be moved by an adjusting-screw $a^{22}$ to adjust the tension of the springs. The springs $a^{20}$ yieldingly support the clamping-bar $a^{10}$ and permit it to accommodate itself to hides of different thickness.

The levers $a^{12}$ are actuated by cams, herein shown as comprising plates or disks $b$, provided with cam-grooves $b'$, in which travel rollers $b^2$, mounted on pins $b^3$, carried by the free ends of the levers $a^{12}$, whereby the said cams act directly upon the said levers and whereby the construction of the clamping mechanism is simplified and improved. The cam-disks $b$ are stationary, being secured to the side frames $a^3$ $a^4$, and their grooves are of suitable shape to open the movable jaw, to hold it open while the skin or hide is being placed in the drum, to gradually close the jaw, and to hold the jaw closed while the hide or skin is being treated. In the present instance the movable jaw is opened while the rollers $b^2$ are traveling in their cam-grooves from about the point 30 to the point 31, is held open from the point 31 to the point 32, is gradually closed from the point 32 to the point 33, and is held closed from the point 33 to the point 30.

While the hide or skin is clamped to its traveling support, it is designed to be acted upon by an operating-tool, which in accordance with this invention is a practically stationary tool having a substantially large or extended surface in contact with the hide or skin, in contradistinction to a revolving tool or cylinder, such as now commonly used in unhairing-machines as heretofore made and known to me and which has only a tangential surface contact with the hide or skin.

The operating-tool referred to may be made as herein shown, (see Figs. 4, 5, and 6,) it consisting of a back portion composed of side bars 2 3, end bars 4 5, having projecting lugs or ears 7 8, and a plurality of blades 10, attached to the front portion of the side bars and which may be cast in one piece therewith or made separate therefrom and firmly affixed thereto.

The blades 10 may and preferably will be arranged in sets which extend in opposite directions, preferably from at or near the longitudinal center of the tool, and the blades near the center for the best results break joints or extend beyond a transverse line through the center of the tool. The active faces of the blades are shaped to conform to the shape of the support for the hide or skin. The operating-tool is yieldingly engaged with the hide or skin preferably in a twofold manner, as will be described.

The ends 7 8 of the operating-tool are extended into enlarged boxes $d\,d'$, in which they are fitted substantially tight, as shown in Fig. 7, the said boxes having, as shown, cylindrical extensions $d^2\,d^3$, which are supported by substantially vertical pivoted arms or levers $d^4\,d^5$, pivoted to the side frames and having their upper ends normally drawn toward the support for the leather, preferably by springs $d^6\,d^7$ encircling rods $d^8\,d^9$, pivoted to the levers $d^4\,d^5$ and extended through cylindrical bosses $d^{10}\,d^{12}$, attached to the side frames $a^3\,a^4$.

The tension of the springs $d^6\,d^7$ may be regulated by adjusting-nuts $d^{13}\,d^{14}$ on the rods $d^8\,d^9$, and the movement of the levers $d^4\,d^5$ toward the drum or work-support may be limited by adjusting-screws $d^{16}\,d^{17}$, adapted to strike against the bosses $d^{10}\,d^{12}$.

The operating-tool may be adjustably supported in the levers $d^4\,d^5$ by screws $d^{18}\,d^{19}$. The ends of the operating-tool extended into the boxes $d\,d'$ may be engaged by yielding material, shown as spiral springs $d^{20}$, which act to hold the blades of the tool in engagement with the hide or skin with a yielding pressure, which may be varied by means of adjusting-screws $d^{21}\,d^{22}$, (see Figs. 1 and 7,) and the movement of the tool in its boxes toward the drum or work-support may be limited by adjusting-screws $d^{23}\,d^{24}$.

In the present instance the front or active faces of the blades 10 of the operating-tool are curved to substantially conform to the curve of the drum-segments, and by reference to the drawings it will be seen that each blade for substantially its entire length is in contact with the hide or skin, and consequently a substantially large area of surface contact is obtained between the blades of the operating-tool and the hide or skin in contradistinction to a tangential contact, and as a result a more efficient removal of the hairs is effected.

The machine herein shown is designed to remove not only the long and coarse hairs, but also the short and fine hairs, together with the dirt in the pores of the hide or skin, without injury to the grain of the hide or skin, whereby the hand operation now practiced to remove the fine hairs is avoided or at least largely reduced.

I have herein shown the unhairing-tool as used with a rotatable support; but I do not desire to limit my invention in this respect, as it may be used with other forms of supports. The drum-segments may be rotated in one direction by a gear $f$ in mesh with a pinion $f'$ on a driving-shaft $f^2$, provided with a pulley $f^3$.

The clamping mechanism for the segment $a'$ is lettered the same as the clamping mechanism for the segment $a$, with the addition of the affix $a$.

I claim—

1. In a machine of the class described, the combination of the following instrumentalities, viz: a traveling support for the hide or skin, an operating-tool extended across the said support and comprising a back portion and a plurality of sets of blades secured thereto with their active faces extended in the direction of the travel of the said support, means to yieldingly hold said faces in engagement with the hide or skin, movable supports carrying said tool and yielding means, and means to yieldingly hold said supports toward said traveling support, substantially as described.

2. In a machine of the class described, the combination of the following instrumentalities, viz: a traveling support for the hide or skin, and a non-rotatable operating-tool provided with a series of blades extended in the direction of the travel of said support and adapted to engage the hide or skin for substantially their length, a support for the operating-tool, and means to yieldingly hold said tool-support toward the said traveling support for the hide or skin, substantially as described.

3. In a machine of the class described, the combination of the following instrumentalities, viz: a traveling support for the hide or skin, a non-rotatable operating-tool extended transversely across said support and having a plurality of blades extended in the direction of the travel of said support to make contact with the hide or skin thereon for substantially their entire length, movable supports for the said operating-tool, and means to yieldingly hold said supports toward the hide-support, substantially as described.

4. In a machine of the class described, the combination of the following instrumentalities, viz: a traveling support for the hide or skin, a non-rotatable operating-tool having a substantially large area of surface contact with the hide or skin, boxes in which said tool is yieldingly supported, levers or pivoted arms in which said boxes are supported, and means to yieldingly hold said levers toward the hide-support, substantially as described.

5. In a machine of the class described, the combination of the following instrumentalities, viz: a rotatable support for the hide or skin, and an operating-tool substantially stationary with relation to the rotatable support, and provided with a series of blades having their active faces curved to conform to the shape of the rotatable support, said blades being arranged in sets which extend in opposite directions, substantially as described.

6. In a machine of the class described, the combination of the following instrumentalities, viz: a rotatable support for the hide or skin, an operating-tool substantially stationary with relation to the rotatable support and having a plurality of curved active surfaces, substantially as described.

7. In a machine of the class described, the combination of the following instrumentalities, viz: a rotatable support for the hide or skin, an operating-tool substantially stationary with relation to the rotatable support and having a plurality of curved active surfaces, and means to yieldingly hold said tool in engagement with the hide or skin, substantially as described.

8. In a machine of the class described, the combination of the following instrumentalities, viz: a segmental drum, a clamping mechanism coöperating therewith and provided with a movable jaw comprising a clamping-bar, levers or arms pivoted within the drum-segment to move toward the center in the act of opening, and a yielding medium interposed between said levers and said clamping-bar, substantially as described.

9. In a machine of the class described, the combination of the following instrumentalities, viz: a segmental drum, a clamping mechanism coöperating therewith and provided with a movable jaw comprising a clamping-bar, levers or arms pivoted within the drum-segment to move toward the center in the act of opening, and a yielding medium interposed between said levers and said clamping-bar, cam-rollers carried by said levers, and cams to act on said rollers, substantially as described.

10. In a machine of the class described, the combination of the following instrumentalities, viz: a segmental drum, a clamping mechanism coöperating therewith and provided with a movable jaw comprising a clamping-bar, levers or arms pivoted within the drum-segment to move toward the center in the act of opening, and a yielding medium interposed between said levers and said clamping-bar, cam-rollers carried by said levers, and cams provided with cam-grooves in which said rollers travel, substantially as and for the purpose specified.

11. In a machine of the class described, the combination of the following instrumentalities, viz: a clamping mechanism comprising a stationary jaw, and a movable jaw comprising a clamping-bar, supports for said bar pivoted within the drum-segment and movable toward the center of the drum in the act of opening, and a yielding medium between said clamping-bar and its supports, substantially as described.

12. In a machine of the class described, the combination of the following instumentalities, viz: a segmental drum, a clamping mechanism coöperating therewith and comprising a jaw attached to the drum, a movable jaw pivoted within the drum at one side the center thereof to move toward the center of the drum in the act of opening and having its free end at opposite sides of the drum provided with rollers, and cams to act on said rollers, substantially as described.

13. In a machine of the class described, the combination of the following instrumentalities, viz: a segmental drum, a clamping mechanism coöperating therewith and comprising a jaw attached to the drum, a movable jaw pivoted within the drum at one side the center thereof to move toward the center of the drum in the act of opening and having its free end at opposite sides of the drum provided with rollers, and cam-grooves at opposite sides of the drum into which said rollers project, substantially as described.

14. In a machine of the class described, the combination of the following instrumentalities, viz: a segmental drum, a clamping mechanism coöperating therewith and provided with a movable jaw comprising a clamping-bar, levers or arms pivoted within the drum-segment to move toward the center in the act of opening and to which said clamping-bar is secured intermediate of the pivot and free ends of said levers, rollers carried by the free ends of said levers, and cams to act on said rollers, substantially as described.

In testimony whereof I have signed my name to this specification in the presence of two subscribing witnesses.

CHAS. P. VAUGHN.

Witnesses:
LAWRENCE PURTELL, Jr.,
WALTER R. TANCH.